Dec. 9, 1969   E. A. HARRIS ET AL   3,483,066
ULTRASONIC TOOL WITH FIXTURING MEANS
Filed Jan. 6, 1967   2 Sheets-Sheet 1
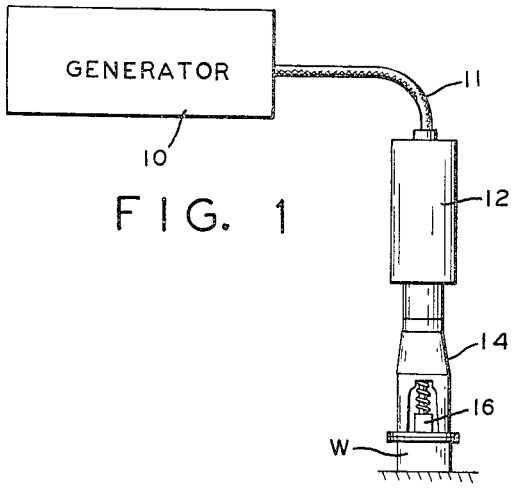
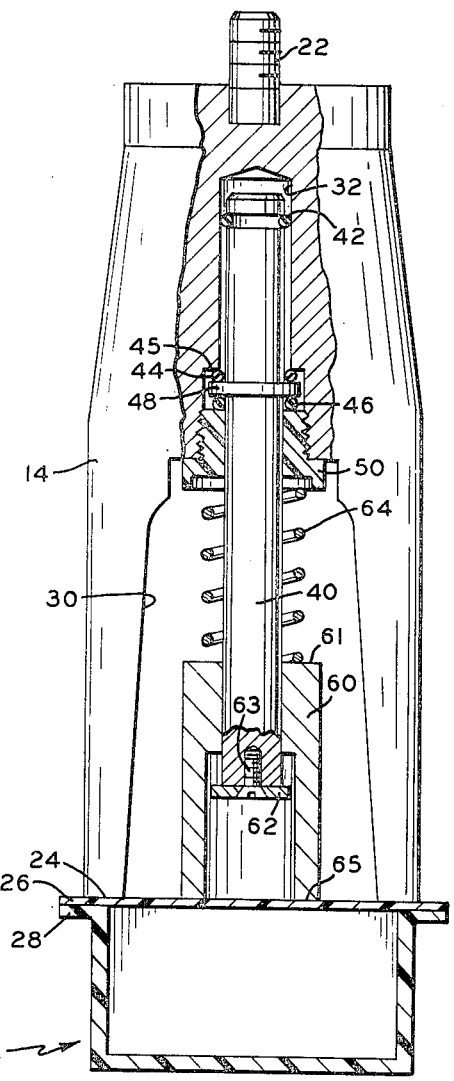
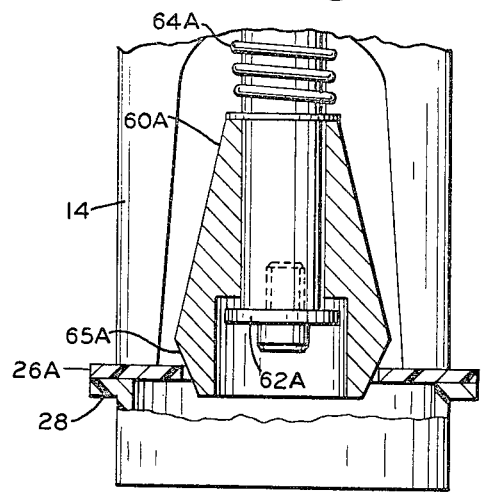
EVERETT A. HARRIS
JOHN JUGLER
INVENTORS.
BY
Ervin B. Steinberg

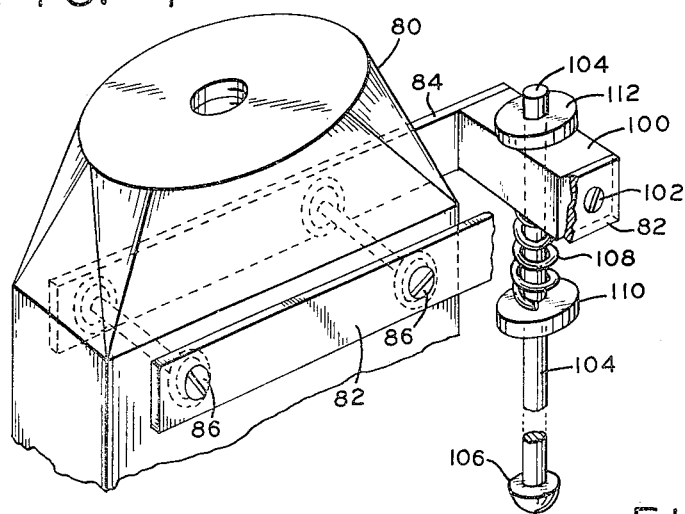
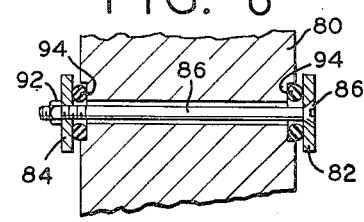
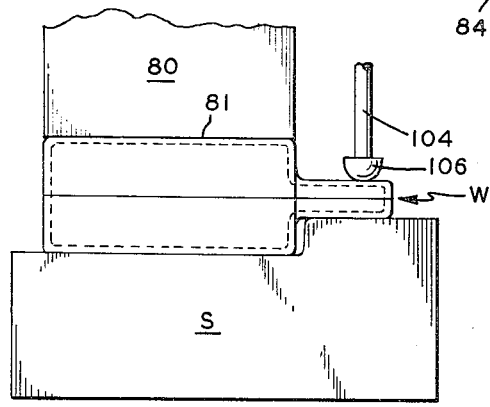

United States Patent Office 3,483,066
Patented Dec. 9, 1969

3,483,066
ULTRASONIC TOOL WITH FIXTURING MEANS
Everett A. Harris, Ridgefield, and John Jugler, Danbury, Conn., assignors to Branson Instruments Incorporated, Stamford, Conn., a corporation of Delaware
Filed Jan. 6, 1967, Ser. No. 607,805
Int. Cl. B29c 27/08; B32b 31/16
U.S. Cl. 156—580                    15 Claims

ABSTRACT OF THE DISCLOSURE

An ultrasonic tool for engaging a workpiece and transferring energy thereto is provided with a fixturing means for holding and retaining portions of the workpiece during the time that sonic energy is applied.

---

This invention refers to an ultrasonic tool and has specific reference to an ultrasonic tool which engages a workpiece for transferring sonic energy thereto, such as occurs in the process of welding thermoplastic parts by sonic energy.

In welding thermoplastic parts to each other by sonic energy, it is often necessary to accurately locate the parts to be welded in relation to each other before the sonic energy is applied which provides the permanent joint. While in many instances it is possible to provide the individual parts with locating grooves, pins, and other suitable means, there are many assemblies where such provision is not available or possible. At other times, one of the parts to be joined to an assembly is flexible and needs to be held in order to limit its motion or vibration while sonic energy is applied.

The instant invention refers to an ultrasonic tool which includes a fixturing means mounted upon and supported by the ultrasonic tool, whereby the fixturing means engages the workpiece in order to hold one or more of the portions thereof during the time that sonic energy is transferred from the tool to the workpiece. In this manner a single unitary device is achieved which is characterized by simplicity and ease of operation, yet which accomplishes many tasks which could be performed heretofore only with great difficulty.

One of the principal objects of this invention is, therefore, the provision of a new and improved ultrasonic tool.

Another important object of this invention is the provision of an ultrasonic tool comprising a horn adapted to oscillate at ultrasonic frequency and a fixturing means supported therefrom for engaging a portion of the workpiece during the time that the horn transfers sonic energy to the workpiece.

Another object of this invention is the provision of an ultrasonic tool comprising a horn and a fixturing means forming a part thereof, the fixturing means engaging the workpiece and holding it prior and during the time that the horn transfers sonic energy to the workpiece.

A further object of this invention is the provision of an ultrasonic welding tool comprising a horn which is adapted to oscillate at an ultrasonic frequency and a fixturing means, suspended therefrom in acoustically isolated relation, for engaging the workpiece which is being welded whereby to maintain alignment between the parts to be joined.

Further and still other objects of this invention will be more readily apparent from the following description when taken in conjunction with the accompanying drawings, in which:

FIGURE 1 is a schematic block diagram of the ultrasonic tool and its associated parts;

FIGURE 2 is an elevational sectional view of a typical embodiment of the invention;

FIGURE 3 is an elevational sectional view of another embodiment;

FIGURE 4 is a perspective view of still another embodiment;

FIGURE 5 is a sectional view of a portion of FIGURE 4; and

FIGURE 6 is a schematic view showing the use of the tool per FIGURES 4 and 5.

Referring now to the figures and FIGURE 1 in particular, numeral 10 refers to an electrical high frequency generator which provides via a conductor 11 electrical energy, typically 20 kilocycles per second, to an electroacoustic converter 12 which is fitted with a velocity transformer or resonant vibrator 14, commonly referred to as a "horn." The horn is in engagement with a workpiece W, in order to transfer sonic energy thereto, for instance, to weld a cover to a box-like receptacle. The horn 14 is bell shaped, having an internal cavity, through which a fixturing means 16 extends, the latter being designed and arranged for engaging the workpiece during the sonic welding process.

FIGURE 2 shows the detailed construction of the ultrasonic tool and its associated fixturing means. The horn 14 is secured to the converter 12 by means of a threaded stud 22. The frontal surface 24 of the horn is in contact with the flat cover 26 of the workpiece W for transferring sonic energy, causing a weld between the cover 26 and the receptacle 28. The cover 24 and receptacle 28, in a typical case, are made of thermoplastic material.

In order to steady the cover 26 during the welding operation, so as to retain it in place and prevent its vibration, the horn is provided with a fixturing means which extends downward through the central cavity 30 of the horn 14.

The fixturing means includes a central bolt 40 depending from a recess 32 of the horn and is centered therein by means of an O-ring 42, made of resilient material and resting in a groove of the bolt 40, and a further set of similar O-rings 44 and 46 which straddle a radial projection 48 encircling the bolt 40. The bolt 40 is retained in the recess 32 by means of an externally threaded nylon bushing 50 which is in threaded engagement with the horn 14 and applies a moderate amount of compression upon the resilient rings 44 and 46, causing the ring 44 to abut against the surface 45. In the preferred construction, the resilient rings 44 and 46 are disposed substantially in the nodal zone of the longitudinally oscillating horn so that the bolt 40 is substantially acoustically isolated from the motion of the horn.

A pressure bushing 60 is mounted for sliding motion on the bolt 40 and is urged toward a stop washer 62 by means of a helical spring 64 which is interposed between the underside of the bushing 50 and the top surface 61 of the pressure bushing 60. The stop washer 62 limits the downward motion of the bushing 60 and is secured to the bolt by a screw 63.

Operation of this tool may be visualized as follows: As the converter 12 with the ultrasonic tool, comprising the horn 14 and fixturing means 16, is lowered into engagement with the workpiece W, the underside 65 of the pressure bushing 60 establishes the initial contact with the cover 26 and presses the cover against the receptacle 28 while sliding upward against the force exerted by the spring until the frontal surface 24 of the horn 14 engages the cover 26. Subsequently the generator 10 is energized to cause a fusion joint between the cover 26 and the receptacle 28 along mating surfaces. During the weld cycle the pressure bushing 60 not only holds the cover 26 in place, but also pre-stresses the cover to prevent uncontrolled flexing and fluttering thereof. Therefore, the fixturing means is used for engaging the workpiece at a first location, retaining the workpiece in proper position, and steadying it during the subsequent weld cycle. Also, as the frontal surface 24 of the horn vibrates longitudinally during the weld cycle, the bushing 60 remains firmly seated on the cover 26 by reason of the pressure provided by the spring 64.

FIGURE 3 shows another embodiment wherein the fixturing means is used to center and hold an apertured cover against the receptacle. As can be seen, the pressure bushing 60A is urged by a spring 64A against a stop washer 62A. The presure busing 60A is provided at its lower end with a conical peripheral surface 65A for engaging the central aperture of the cover 26A which is to be sealed to the receptacle 28. In this embodiment the fixturing means is used to center a part of the workpiece prior to welding and then to hold the part during the ensuing weld cycle.

FIGURES 4 through 6 illustrate still another embodiment of the present invention wherein the fixturing means is mounted to an exterior surface of the horn. The horn 80 is of circular shape at the area of its attachment to the converter 12, but then assumes a rectangular shape. Two elongated, horizontally disposed, bars 82 and 84 are mounted to opposite flat sides of the horn 80 by a pair of screws 86, and respective nuts 92, see FIGURE 6. Between the bars 82 and 84 and the horn surface there are disposed resilient O-rings 94 which provide acoustic isolation between the fixturing means and the oscillating horn. The respective bores of the horn through which the bolts extend are drilled to have sufficient clearance with the shank of the bolt for permitting the horn to oscillate, while the fixturing means is substantially isolated, i.e. stands still. Also, the fixturing means is attached to the horn substantially at the nodal zone of the horn in order to minimize longitudinal vibration of the fixturing means.

At the overhanging end of the bars 82 and 84 a cross block 100 is provided, fastened to the bars by means of a screw bolt 102. A round bar 104, fitted at its lower end with a pressure foot 106, extends for sliding motion through an aperture in the block 100. The bar 104 is urged in a downward direction by a helical coil spring 108 which encircles the bar 104 and which is confined in the space between a washer 110, fixed to the bar 104, and the underside of the block 100. The downward sliding motion of the bar 104 is limited by a washer 112 attached to the bar 104 at the portion protruding from the top of the block 100.

In operation, as the horn 80 moves downward for contacting the workpiece W, resting in a support S, the entire fixturing means supported upon the horn 80 moves along in unison with the horn. As the horn approaches the workpiece W, initial contact with the workpiece is established by the foot 106, made of rubber, nylon, or other suitable material. The foot presses the laterally extending flanges of the workpiece W into intimate contact as a result of the force exerted by the spring 108. As the horn comes down further, the bar 104 retains such pressure upon the workpiece while being forced to slide upward within the block 100 until the frontal surface 81 of the horn is in intimate contact with the workpiece, whereupon the generator 10, FIGURE 1, is energized for a brief period to cause the transfer of sonic energy. By virtue of the pressure exerted by the foot 106, the extending upper and lower flange halves of the workpiece W are urged into intimate contact with one another along their mating surfaces and a fushion joint occurs thereat as has been described in U.S. Patent No. 3,224,916 dated Dec. 21, 1965, this joint being remote from the location at which the horn 80 engages the workpiece.

It will be apparent that the fixturing means may be designed and used in an unlimited variety and that the above embodiments are merely illustrative of the wide range which exists. The fixturing means at the engagement with the workpiece may have specifically articulate elements for holding, pressing, centering, expanding, contracting, etc. to name but a few of the variations possible.

The design of horns for ultrasonic welding is well known in the art and described, for instance, in "Ultrasonic Engineering" (book) by Julian R. Frederick, John Wiley & Sons, Inc., New York, N.Y. (1965), pp. 87–103; or in "Physical Acoustics" (book) by Warren P. Mason, volume 1, part B, Academic Press, New York, N.Y. (1964), pp. 353–363 "The Design of Resonant Vibrators." The converter 12 may be of the type shown in U.S. Patent No. 3,328,610 issued to S. E. Jacke et al. on June 27, 1967 entitled "Sonic Wave Generator." Ultrasonic welding of parts is shown, for instance, in U.S. Patent No. 3,224,916 issued to R. S. Soloff et al. on Dec. 21, 1965 entitled "Sonic Method of Welding Thermoplastic Parts," or in U.S. Patent No. 2,633,894 issued to P. B. Carwile on Apr. 7, 1953 entitled "Plastic Welding."

What is claimed is:
1. An ultrasonic tool comprising:
  a horn adapted to oscillate at an ultrasonic frequency and be in contact with a workpiece for transferring sonic energy thereto, and
  a fixturing means mounted to said horn and extending therefrom for engaging the workpiece and supporting a portion thereof while said horn is in sonic energy transferring relation with the workpiece.
2. An ultrasonic tool comprising:
  a horn adapted to oscillate at an ultrasonic frequency and be in contact with a workpiece for transferring sonic energy thereto, and
  a fixturing means mounted acoustically isolated to said horn and extending therefrom for engaging the workpiece and supporting a portion thereof while said horn is in sonic energy transferring relation with the workpiece.
3. An ultrasonic tool as set forth in claim 2 wherein said horn is of longitudinal shape and oscillates in the longitudinal mode.
4. An ultrasonic tool is set forth in claim 2 wherein said horn is adapted to contact the workpiece at a first location and said fixturing means is adapted to engage the workpiece at a second location.
5. An ultrasonic tool as set forth in claim 2 wherein said horn has an internal cavity and said fixturing means extends through said cavity to the workpiece.
6. An ultrasonic tool as set forth in claim 2 wherein said fixturing means is mounted to the outside surface of said horn.
7. An ultrasonic tool as set forth in claim 2 wherein said fixturing means is mounted to said horn by means of resilient means substantially at a nodal zone of the horn.
8. An ultrasonic tool as set forth in claim 2 wherein said horn and fixturing means move in part in unison toward and away from a workpiece.
9. An ultrasonic tool as set forth in claim 2 wherein resilient means are mounted between said horn and said fixturing means for urging said fixturing means in forced contact with the workpiece.
10. An utrasonic tool as set forth in claim 9 wherein said fixturing means is dimensioned to provide the initial engagement between said tool and workpiece.
11. An ultrasonic tool comprising:
  a means adapted to provide sonic energy to a workpiece and be in sonic energy transferring relation with such workpiece;
  a fixturing means mounted to said means for providing sonic energy, and
  said fixturing means being disposed to provide the initial engagement between said tool and workpiece and to retain a portion of said workpiece during the time of sonic energy transfer between said means and workpiece.
12. An ultrasonic welding tool comprising:
  a horn adapted to engage with its frontal surface a workpiece at a first location thereof for transferring sonic energy to such workpiece;

a fixturing means supported by said horn for motion therewith toward and away from a workpiece and said fixturing means including an element dimensioned to engage the workpiece at a second location prior to the engagement between said horn and workpiece when said tool is brought into engagement with the workpiece;

means providing for limited relative motion between said horn and said element to enable said element to engage the workpiece at said second location immediately prior to the engagement between said horn and workpiece and to maintain such engagement with the workpiece when said horn is in engagement with the workpiece at said first location, and means operative upon said element to cause it to exert a force upon the workpiece at said second location while said horn engages the workpiece at said first location and transfers sonic energy thereto.

13. An ultrasonic welding tool as set forth in claim 12, said element being mounted for limited sliding motion relative to the frontal surface of said horn.

14. An ultrasonic welding tool as set forth in claim 13, said element being mounted for sliding motion along a shaft which is supported by said horn, and said means operative upon said element is a spring means urging said element toward one position along said shaft.

15. An ultrasonic welding tool as set forth in claim 14 wherein said spring means encircles said shaft.

References Cited
UNITED STATES PATENTS 3,101,634  8/1963  Cooper _____ 156—73

ROBERT F. STAHL, Primary Examiner

U.S. Cl. X.R.

156—73; 228—1; 264—23

PO-1050
(5/69)

UNITED STATES PATENT OFFICE
CERTIFICATE OF CORRECTION

Patent No. 3,483,066                     Dated December 9, 1969

Inventor(s) Everett A. Harris and John Jugler

It is certified that error appears in the above-identified patent and that said Letters Patent are hereby corrected as shown below:

Column 3, line 67, "fushion" should read -- fusion --;

Column 4, lines 67 - 68, cancel "for provid-ing" and substitute --adapted to provide--.

SIGNED AND
SEALED
MAY 5 1970

(SEAL)
Attest:

Edward M. Fletcher, Jr.
Attesting Officer

WILLIAM E. SCHUYLER, JR.
Commissioner of Patents